(12) United States Patent
Flook et al.

(10) Patent No.: US 7,995,791 B2
(45) Date of Patent: Aug. 9, 2011

(54) ATM SECURITY SYSTEM

(75) Inventors: Ronald Arthur Flook, Burlington (CA);
Steven Barnett Rakoff, Toronto (CA);
Marcin Parkitny, Brampton (CA)

(73) Assignee: UTC Fire & Security Corporation, Farmington, CT (US)

( * ) Notice: Subject to any disclaimer, the term of this patent is extended or adjusted under 35 U.S.C. 154(b) by 951 days.

(21) Appl. No.: 11/587,682

(22) PCT Filed: Apr. 29, 2005

(86) PCT No.: PCT/US2005/014994
§ 371 (c)(1),
(2), (4) Date: Oct. 29, 2007

(87) PCT Pub. No.: WO2005/109315
PCT Pub. Date: Nov. 17, 2005

(65) Prior Publication Data
US 2008/0191860 A1      Aug. 14, 2008

(51) Int. Cl.
*G06K 9/00* (2006.01)
(52) U.S. Cl. ............... 382/100; 382/217; 340/568.1; 348/150
(58) Field of Classification Search .......... 382/209, 382/100, 217–220; 348/143, 150; 340/568.1
See application file for complete search history.

(56) References Cited

U.S. PATENT DOCUMENTS

| | | | |
|---|---|---|---|
| 4,679,077 A * | 7/1987 | Yuasa et al. | 348/154 |
| 5,091,780 A * | 2/1992 | Pomerleau | 348/152 |
| 6,400,276 B1 | 6/2002 | Clark | |
| 6,424,249 B1 | 7/2002 | Houvener | |
| 6,609,659 B2 | 8/2003 | Sehr | |
| 7,240,827 B2 * | 7/2007 | Ramachandran et al. | 235/379 |
| 2002/0039135 A1 * | 4/2002 | Heyden | 348/143 |
| 2002/0061134 A1 * | 5/2002 | Cofer et al. | 382/181 |
| 2002/0125435 A1 * | 9/2002 | Cofer et al. | 250/341.1 |
| 2003/0180039 A1 * | 9/2003 | Kakou et al. | 396/427 |
| 2004/0042642 A1 | 3/2004 | Bolle et al. | |

FOREIGN PATENT DOCUMENTS

| | | |
|---|---|---|
| EP | 0967584 A2 | 12/1999 |
| GB | 2364808 A | 2/2002 |
| WO | 02073950 A2 | 9/2002 |

OTHER PUBLICATIONS

PCT International Preliminary Report on Patentability for International Application No. PCT/US05/14994 filed Apr. 29, 2005.

(Continued)

Primary Examiner — Jon Chang
(74) Attorney, Agent, or Firm — Carlson, Gaskey & Olds PC

(57) ABSTRACT

A security system useful for monitoring an automated teller machine (ATM) includes a camera that provides images of at least selected portions of the ATM. A controller automatically determines whether a difference between a reference image of the ATM and a subsequently acquired image from the camera indicates an alteration to the ATM. One example provides the ability to detect whether a skimming reader has been placed adjacent a card receiving slot. A disclosed example includes acquiring a plurality of reference images corresponding to different lighting conditions and using an appropriate one of the reference images based upon a lighting condition or time of day associated with a subsequently acquired image.

20 Claims, 1 Drawing Sheet

OTHER PUBLICATIONS

Supplementary European Search Report for Application No. EP 05 74 0931 dated Mar. 29, 2010.
"Automatic On-Line Signature Verification," Proceedings of the IEEE, vol. 85, No. 2, Feb. 1997, pp. 215-239; 0018-9219/97$10.00@1997 IEEE.

International Search Report for International Application No. PCT/US05/14994 mailed Jan. 20, 2006.
Written Opinion of the International Searching Authority for International Application No. PCT/US05/14994 mailed Jan. 20, 2006.

* cited by examiner

ATM SECURITY SYSTEM

BACKGROUND OF THE INVENTION

This invention generally relates to security systems. More particularly, this invention relates to security systems useful for monitoring potential alterations of automated teller machines.

Automated teller machines (ATMs) have become well known and widely used. ATMs allow individuals twenty-four hour access to their bank accounts to conduct a number of transactions. One advantage to ATMs is their convenience to bank customers. Another advantage is the ability for banks to have transactions automated, which presents a cost savings to the bank.

One feature of known ATMs is that they require a sufficient amount of information regarding a bank customer before allowing a transaction to be completed. The conventional way of providing such information to the ATM is by inserting a card that includes a magnetic strip containing customer information. Maintaining such information confidential and secure has recently become problematic.

Skimming readers have been developed that are placed over a card reader slot on an ATM. These skimming readers read the magnetic strip on the card as a bank customer inserts their card for purposes of conducting a transaction with the bank. The skimming reader scans the magnetic strips of cards inserted into the card reader slot and gathers the information regarding each individual and their account.

By using a hidden camera or a secretly located individual, the customer's access code (i.e., a manually entered PIN) can be gathered. That information combined with the information gathered by the skimming reader allows an unauthorized individual to gain unauthorized access to the individual's bank account or accounts and make illegal fund withdrawals.

There is a need for a system that protects against such skimming. This invention addresses that need.

SUMMARY OF THE INVENTION

An exemplary disclosed security system for monitoring an ATM includes a camera that provides at least one reference image of at least a portion of the ATM. The camera also provides at least one subsequently acquired image of the same portion of the ATM. A controller automatically determines whether a difference between the reference image and the subsequently acquired image indicates an alteration to the ATM.

In one example, the controller provides an indication of an alert condition when a difference between the reference image and the subsequently acquired image indicates an alteration to the ATM.

One example includes making sure that there is no motion in the vicinity of the ATM that would result in a difference between the reference image and the subsequently acquired image to avoid a false positive detection of a potential alteration of the ATM. One example includes a motion detector for providing an indication of such motion.

One example includes acquiring a plurality of reference images, each corresponding to a different condition that may affect the appearance of the ATM in an image of the ATM. One example includes acquiring different reference images for different times of day. Another example includes acquiring different reference images corresponding to different lighting conditions that may affect shadowing, for example. The controller in one example determines which reference image corresponds to a condition associated with the subsequently acquired image and uses the appropriate reference image for determining whether there may have been an alteration to the ATM. In another example, the controller uses the different reference images to rule out any problem areas from the field of vision of the camera or the subject ATM.

The various features and advantages of this invention will become apparent to those skilled in the art from the following detailed description of a currently preferred embodiment. The drawing that accompanies the detailed description can be briefly described as follows.

DETAILED DESCRIPTION

Figure 1:
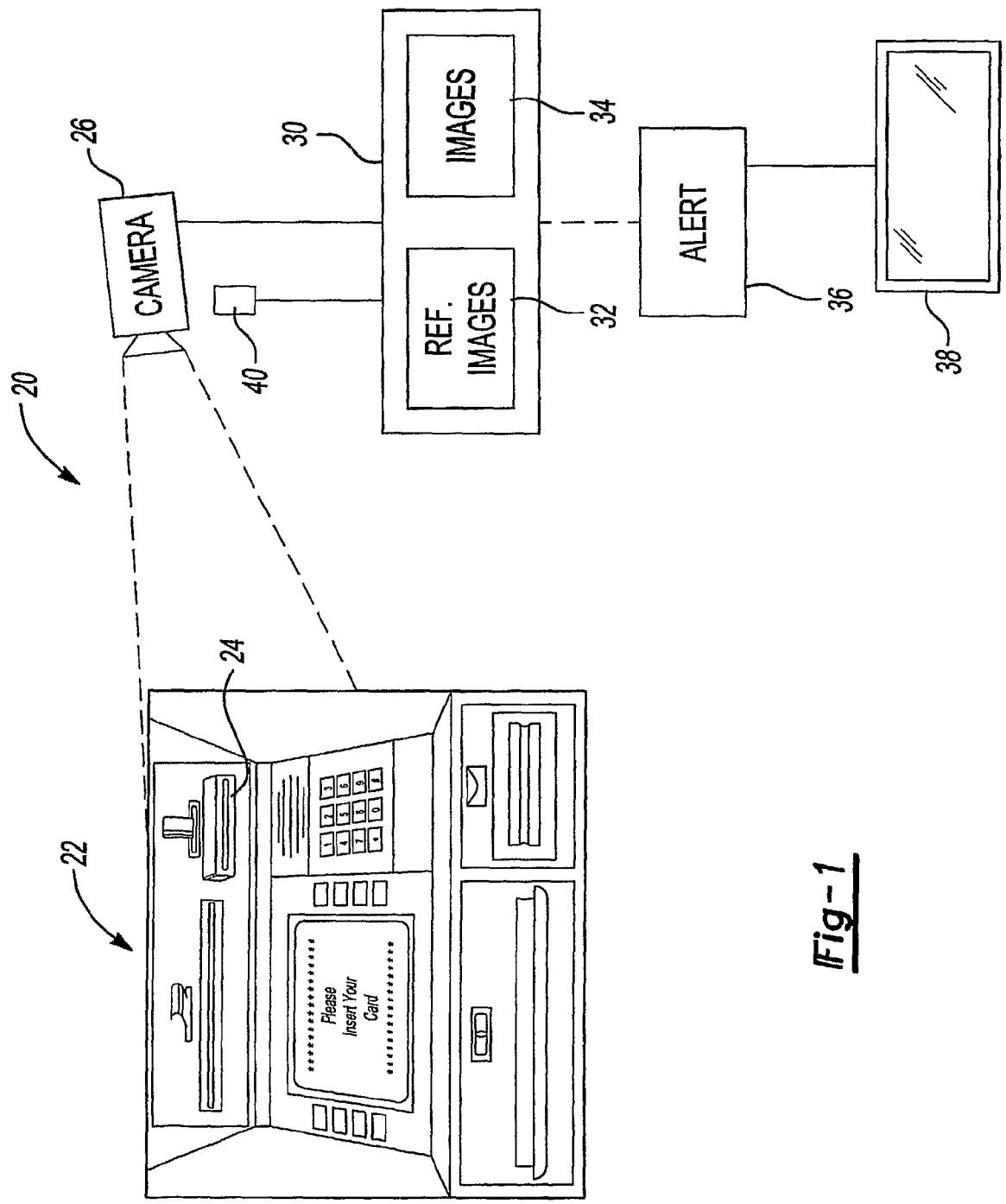
FIG. 1 schematically illustrates selected portions of an example security system for monitoring an automated teller machine.

FIG. 1 schematically shows one example system 20 for providing security at an automated teller machine (ATM). An ATM interface 22 is schematically shown including a card reader portion 24 for receiving a card that includes a readable strip of information. In one example, a card having a magnetic strip encoded with appropriate information allows an individual to gain access to a bank account after inserting the card into the card reader portion and then entering a personal identification number (PIN).

A camera 26 has a field of vision arranged to view the ATM interface 22, or at least portions of it, including the card reader portion 24. In one example, the camera 26 is a CCTV camera that operates in a known manner to provide digital images of the ATM interface 22.

A controller 30 includes an image processing module for gathering information regarding the ATM interface 22 and processes that information in a manner that allows for detecting whether a skimming reader may have been appended to the ATM interface or some other alteration has been made. In one example, the image processing module uses known digital video processing and analysis techniques for automatically making such a determination.

In the illustrated example, a database 32 of reference images acquired by the camera 26 can be utilized by the controller 30. Each reference image shows the ATM interface 22 when it is in a known condition. In one example, the database 32 includes reference images of the ATM interface 22 under various lighting conditions so that a full appreciation of the various shadowing and other lighting effects that may change during the course of a day, for example, are maintained and available for the controller 30. In one example, the reference image information is stored in connection with an associated time of day or range of times during which that particular image is an acceptable reference for the expected look of the ATM interface.

In one example, the controller 30 goes through a learning phase to determine whether any portions of reference images are prone to changes or unclarities that would be problematic when later using the reference images. For example, one side of an ATM may always appear dark because of shadowing. The controller 30 in one example learns where such areas within an image occur and rules out a corresponding portion of images processed to determine a condition of the ATM.

The camera 26 remains focused on the appropriate portions of the ATM interface 22 and periodically acquires an image 34 of the ATM interface 22. The image processing module automatically compares a most recent subsequently acquired image with an appropriate reference image from the database 32. Whenever there is a discrepancy or difference between a subsequently acquired image and an appropriate reference image, the alert is provided to an alert module 36. In one example, the alert module 36 provides an indication to an individual that there is a suspicious condition of a particular ATM.

In one example, the reference image and the most recent subsequently acquired image that instigated the alert are presented on a display 38 associated with the alert module 36 so that an individual can manually, visually analyze and compare the images. The individual is then able to decide whether the difference indicates that some alteration to the ATM may have been made, such as placing a skimming reader over the card reader portion 24.

In one example, the subsequently acquired images 34 used for determining a current condition of the ATM are only collected under static conditions to avoid having the presence of an individual in front of the ATM interface 22 being interpreted as a change to the interface that would otherwise generate a potential alert. The illustrated example includes a motion detector 40 for providing an indication of motion in the vicinity of the ATM interface 22. Any known motion detector such as a pyroelectric sensor could be used. In one example, the motion detector 40 is an integrated part of the camera 26. In another example, a separate motion detector 40 is used.

The controller 30 uses information from the motion detector 40 to determine whether there is motion in the vicinity of the ATM interface 22 at a time associated with a subsequently acquired image. In one example, the controller 30 only uses subsequently acquired images that occur under static conditions when there is no motion as indicated by a motion detector, for example.

The example system 20 allows for recognizing when any unauthorized change has been made to an ATM interface. One advantage of such an arrangement is that there is an ability to detect when a skimming reader has been placed over a card slot 24, which would otherwise be unrecognized by the average bank customer. One particular advantage to the disclosed example is that it has the ability to collect a variety of reference image data to address various lighting conditions and the different shadowing that may occur on an ATM interface at different times of day, for example. Having a more accurate, more complete database of reference images allows for more accurate detection of potential alert situations.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of monitoring an ATM, comprising the steps of:
   automatically determining whether a difference between at least a portion of a reference image of at least a portion of the ATM and a corresponding portion of a subsequently acquired image of the portion of the ATM indicates an alteration to the ATM;
   using a learning phase to determine whether the reference image has any portion that would be unreliable when later comparing the subsequently acquired image to the reference image; and
   ruling out a corresponding unreliable portion of the subsequently acquired image that is processed to determine a condition of the ATM.

2. The method of claim 1, comprising providing an indication of an alert condition when the difference indicates an alteration to the ATM.

3. The method of claim 1, comprising providing the reference image and the acquired image to a display device for visual inspection of the images for confirming that the images indicate an alteration to the ATM.

4. The method of claim 1, comprising determining whether the alteration includes a skimming reader placed over a card receiving slot of the ATM.

5. The method of claim 1, comprising determining whether the difference between the reference image and the subsequently acquired image is associated with some movement near the ATM.

6. The method of claim 5, comprising detecting motion in the vicinity of the ATM at a time corresponding to the subsequently acquired image and determining that a resulting difference between the reference image and the subsequently acquired image does not indicate an alteration to the ATM.

7. The method of claim 1, comprising
   obtaining a plurality of reference images corresponding to a plurality of different conditions;
   determining which of the conditions is associated with the subsequently acquired image; and
   using the reference image corresponding to the associated condition for determining whether the difference indicates an alteration to the ATM.

8. The method of claim 7, wherein the conditions comprise times of day and the method includes determining a time of day associated with the subsequently acquired image.

9. The method of claim 7, wherein the conditions comprise lighting conditions and the method includes determining an expected one of the lighting conditions associated with the subsequently acquired image.

10. The method of claim 1, comprising
    obtaining the reference image when the ATM is in a known condition; and
    automatically determining whether there is a difference between the subsequently acquired image and the reference image.

11. A security system for monitoring an ATM, comprising:
    a camera that provides at least one reference image of at least a portion of the ATM and at least one subsequently acquired image of the portion of the ATM; and
    a controller that automatically determines whether a difference between at least a portion of the reference image and a corresponding portion of the subsequently acquired image indicates an alteration to the ATM;
    the controller using a learning phase to determine whether the reference image has any portion that would be unreliable when later comparing the subsequently acquired image to the reference image; and
    the controller ruling out a corresponding unreliable portion of the subsequently acquired image that is processed to determine a condition of the ATM.

12. The system of claim 11, wherein the controller provides an indication of an alert condition when the difference indicates an alteration to the ATM.

13. The system of claim 11, comprising at least one display and wherein the controller communicates with the display device such that the display provides a visual representation of the reference image and the subsequently acquired image for manual, visual inspection of the images for confirming that the images indicate an alteration to the ATM.

14. The system of claim 11, comprising at least one motion detector in the vicinity of the ATM for providing an indication of any motion near the ATM at a time corresponding to the subsequently acquired.

15. The system of claim 14, wherein the controller uses the indication from the motion detector for determining whether there was movement in the vicinity of the ATM at a time associated with the subsequently acquired image.

16. The system of claim 15, wherein the controller only uses a subsequently acquired image from a time when there is no movement in the vicinity of the ATM.

17. The system of claim 11, comprising a database of a plurality of reference images corresponding to a plurality of different conditions and wherein the controller uses one of the reference images corresponding to a condition associated with the subsequently acquired image for determining whether the difference indicates an alteration to the ATM.

18. The system of claim 17, wherein the conditions comprise times of day and the controller determines a time of day associated with the subsequently acquired image.

19. An ATM machine, comprising:
a card receiver for receiving at least a portion of a card that includes a readable portion that provides information regarding at least one account associated with the card;
a camera arranged to provide an image of at least the card receiver; and
a controller that uses a reference image from the camera and determines whether a difference between at least a portion of the reference image and a corresponding portion of a subsequently acquired image from the camera indicates tampering with the card reader;
the controller using a learning phase to determine whether the reference image has any portion that would be unreliable when later comparing the subsequently acquired image to the reference image; and
the controller ruling out a corresponding unreliable portion of the subsequently acquired image processed to determine a condition of the ATM.

20. The ATM machine of claim 19, wherein the reference image corresponds to a known condition of the ATM and the controller periodically uses subsequently acquired images from the camera and automatically determines whether there is a difference between a most recent subsequently acquired image and the reference image.

* * * * *